Patented Dec. 24, 1935

2,025,073

UNITED STATES PATENT OFFICE 2,025,073

CELLULOSE DERIVATIVE AND METHOD OF MAKING THE SAME

George W. Rigby, Wilmington, Del., assignor to E. I. du Pont de Nemours & Company, Wilmington, Del., a corporation of Delaware No Drawing. Application January 9, 1934, Serial No. 705,396

7 Claims. (Cl. 260—100)

This invention relates to cellulose derivatives and the preparation of the same and more particularly to the preparation of cellulose sulfuric acid by a novel procedure.

Cellulose sulfuric acid has been prepared by treating cellulose with a sulfonating agent in various modifications. Thus United States Patent 1,734,291 discloses the preparation of cellulose sulfuric acid by the reaction of chlorosulfonic acid on cellulose in the presence of tertiary amines such as pyridine. British Patent 294,572, French Patent 657,204 and German Patent 490,987 disclose the treatment of cellulose with gaseous sulfur trioxide. British Patent 303,493 discloses the reaction of cellulose with a mixture of sulfuric acid and an organic anhydride. United States Patent 1,866,532 discloses the reaction of sulfuric acid and acetic anhydride on cellulose in the presence of pyridine.

The object of the present invention is the preparation of cellulose sulfuric acid. A further object is the provision of a novel process which permits careful control of the reaction conditions and of the reaction product. A further object is the elimination of difficulties of manipulation found in other processes. Still further objects will appear hereinafter.

These objects are accomplished by the following invention wherein cellulose is reacted with pyrosulfuric acid or its equivalents in the presence of a tertiary amine such as a pyridine with or without a diluent.

The following examples are illustrative of the invention but are not to be construed as limiting the same.

Example 1

To a solution of 245 parts of dioxane in 438 parts of pyridine are added 37 parts by volume of 95% sulfuric acid and 55 parts by volume of chlorosulfonic acid with stirring and cooling. This mixture is incorporated with 45 parts of dry cotton linters and the whole is heated at 70° C. for 6 hours. After filtering off the dioxane solution the solid which remains is extracted with denatured alcohol until chloride free and finally dried at 70° C. The product is pure white and completely soluble in water.

Example 2

Two hundred forty-four parts by volume of 30% oleum are mixed with 2400 parts of pyridine, 47 parts pyridine hydrochloride and 1320 parts of chlorobenzene. To this are added 162 parts by weight of cellulose and the mixture heated to 110° C. for 7 hours. The cellulose gradually swells and finally becomes gelatinous. The liquid is decanted off and the solid which remains is washed first with toluene then with denatured alcohol until halogen free.

Example 3

Four hundred thirty eight parts of pyridine are mixed with 37 parts by volume of 95% sulfuric acid and 55 parts by volume of chlorosulfonic acid. To this mixture are added 45 parts of cellulose. The mixture is heated at 110° C. for two hours. The resulting light brown solution is filtered and precipitated by pouring into a large excess of denatured alcohol. The ester thus obtained is filtered off, washed with alcohol until halogen free and dried at 100° C.

Example 4

Four hundred thirty eight parts of pyridine are mixed with 278 parts of 45% oleum. To this mixture are added 45 parts of cotton linters pulp. The mixture is heated at 110° C. for 2 hours. At the end of this time, the clear solution is filtered and poured into a large excess of denatured alcohol. The solid is filtered off and extracted with denatured alcohol until free from sulfuric acid. The ester thus obtained is pure white and completely soluble in water.

"Pyrosulfuric acid" as used in the claims is contained in any one of the following mixtures of substances:

$H_2SO_4 + ClSO_3H$, which react to form fuming sulphuric acid, fuming sulfuric acid (any per cent $SO_3$), fuming sulfuric acid + HCl (latter as pyridine hydrochloride) $SO_2Cl_2 + H_2SO_4$. $SOCl_2 + H_2SO_4$. $SO_2Cl_2$ and $SOCl_2$ each react with sulfuric acid to form chlorosulfonic acid which in turn reacts with further sulfuric acid to form fuming sulfuric acid.

The proportions of the several components of the above mixture may vary widely. However, as long as one of the components of the mixture is present even in very small amounts at least some pyrosulfuric acid (H₂S₂O₇ or H₂SO₄.SO₃) will be present and the advantages of this invention realized.

In the preferred form of the invention chlorosulfonic acid and sulfuric acid are mixed with an inert diluent which may be dioxane or carbon disulfide and the mixture is then mixed with pyridine which may be dissolved in a solvent such as dioxane or toluene. The mixing takes place as the two streams of liquid unite while descending through a cooled tube. To the solution thus obtained cellulose is added and the mixture stirred with heating to a temperature of 70 to 110° C. until the desired properties are obtained. The product may be isolated by filtering from the diluent and by extracting with denatured alcohol or other liquid which does not dissolve cellulose sulfuric acid.

As starting material any of the ordinary varieties of cellulose may be used including wood pulp, cotton linters, hydro- or oxy-cellulose, and partially substituted cellulose derivatives such as low substituted methyl cellulose or partially substituted cellulose acetate. Starch, inulin, glycogen, or other carbohydrates may be used in place of cellulose.

Instead of pyridine, other tertiary amines such as the picolines, lutidines, collidines, quinoline, ethylpyridine, conyrine, dimethylaniline, diethylaniline, tri-n-butylamine, dimethylcyclohexaylamine, etc., may be used. The temperatures of the reaction may be varied from room temperature to 130° C. although temperatures of from 75–90° C. are preferred. Where pyridine hydrochloride is formed as in the reaction of chlorosulfonic acid and sulfuric acid in pyridine solution lower temperatures may be used than in the case of oleum or pure pyrosulfuric acid. In the latter case temperatures of well over 100° C. may be used without danger of tarry by-product formation or degradation of the cellulose. The time of reaction varies with the temperature, the diluent, the reagents used, the degree of esterification desired, and the viscosity of product desired. Thus, by using 110° C. less time is required for a given amount of esterification than at lower temperatures as for example 70° C. A diluent retards the rate of reaction and therefore longer time for esterification is necessary when using a diluent in order that a given extent of esterification may be realized.

The amount of esterification varies with the product desired. If a completely water soluble product is wished esterification is to be more complete than if a simple pretreatment of the cellulose is desired.

The rate of reaction may be controlled by the catalyst, the diluent, the temperature and the proportion of reagents used. Suitable catalysts include pyridine hydrochloride or hydrobromide, ethylpyridinium chloride, benzylpyridinium chloride, quinoline hydrochloride, picoline hydrochlorides, lutidine hydrochlorides, and other agents which have a pronounced swelling action on cellulose.

Inert diluents may be used in this reaction either to preserve the fibrous form of cellulose or to facilitate mixing during the reaction. The diluents are not essential and in the case of aleum and pyrosulfuric acids are not desirable. Suitable diluents are chlorobenzene, benzene, toluene, dioxane, dibenzylether, di-n-butyl ethane, acetone, diethyl phthalate, etc.

In place of pyrosulfuric acid any of the ordinary equivalents may be used as, for example, mixtures of chlorosulfonic acid and concentrated sulfuric acid, oleum and concentrated sulfuric acid, phosphorous pentoxide and sulfuric acid, etc. The effect of varying proportions of reagents is illustrated by the following table.

TABLE I

Effect of proportions of reagents

| No. | Cellulose kilograms | Pyridine liter | Dioxane liter | Chlorosulfonic acid liter | Sulfuric acid liter | Percent H₂SO₄ in product |
|---|---|---|---|---|---|---|
| 1 | 0.45 | 4.38 | 2.40 | 1.00 | 0 | 31.6 |
| 2 | .45 | 4.38 | 2.40 | .91 | .08 | 34.6 |
| 3 | .45 | 4.38 | 2.40 | .32 | .15 | 34.6 |
| 4 | .45 | 4.38 | 2.40 | .73 | .22 | 32.1 |
| 5 | .45 | 4.38 | 2.40 | .64 | .30 | 16.5 |
| 6 | .45 | 4.38 | 2.40 | .55 | .37 | 33.9 |
| 7 | .45 | 4.38 | 2.40 | .45 | .45 | 17.7 |
| 8 | .45 | 4.38 | 2.40 | .36 | .52 | 8.8 |
| 9 | .45 | 4.38 | 2.40 | .27 | .60 | 1.7 |
| 10 | .45 | 4.38 | 2.40 | .18 | .67 | 2.2 |
| 11 | .45 | 4.38 | 2.40 | .09 | .75 | 2.4 |
| 12 | .45 | 4.38 | 2.40 | 0 | .82 | 3.14 |

The combined amounts of chlorosulfonic acid and sulfuric acid is held constant at 5.5 mols. of SO₃H per glucose unit of the cellulose mol.

The water soluble salts of the cellulose sulfuric acid of the present invention are useful as sizing materials, dispersing agents and as intermediates in preparing cellulose derivatives. Sheets and films may be prepared from this material for special uses.

The process of the present invention affords an ease of control both in mixing the reactants and in control of the final product which is new in the art of the preparation of cellulose sulfuric acid. By-product formation is largely eliminated with consequent saving in material and increased purity of product. The reaction of pyrosulfuric acid on cellulose in the presence of pyridine takes place more rapidly than in the case of sulfur trioxide reacting with cellulose and more smoothly than in the case of chlorosulfonic acid reacting on cellulose in the presence of pyridine.

As disclosed in Table I, use of the proper proportions of acid and acid chloride permit more uniform and more complete esterification of the cellulose. In addition to these advantages which are obvious from Table I, the resulting cellulose sulfuric acid from the product disclosed in such reactions as No. 6, Table I, is much less degraded than the product represented by No. 1, Table I. The derivative, moreover, is less contaminated by tarry by-products than any prepared by processes previously disclosed. In the prior art method of preparing cellulose sulfuric acid, the reagents used were either sulfur trioxide or chlorosulfonic acid. Each of these reagents is very hazardous and difficult to use. In the reaction of cellulose with chlorosulfonic acid even with ice cold pyridine there is the disadvantage that the pyridine tends to sulfonate in place of cellulose sulfuric acid being formed because of the exothermic character of the reaction between pyridine and chlorosulfonic acid. A further difficulty of this process is the tendency for the addition product of chlorosulfonic acid and pyridine to transform itself into colored and tarry by-products under the reaction conditions so that the cellulose derivative formed is contaminated with impurities.

As many apparently widely different embodiments of this invention may be made without departing from the spirit and scope thereof, it is to be understood that I do not limit myself to the specific embodiments thereof except as defined in the appended claims.

I claim:

1. Process for the preparation of cellulose sulfuric acid comprising reacting cellulose with pyrosulfuric acid in the presence of a tertiary amine.

2. Process for the preparation of cellulose sulfuric acid comprising reacting cellulose with a mixture of chlorosulfonic acid and concentrated sulfuric acid in the presence of a tertiary amine.

3. Process for the preparation of cellulose sulfuric acid comprising reacting cellulose with pyrosulfuric acid in the presence of pyridine.

4. Process for the preparation of cellulose sulfuric acid comprising reacting cellulose with a mixture of chlorosulfonic acid and concentrated sulfuric acid in the presence of pyridine.

5. Process for the preparation of cellulose sulfuric acid comprising reacting cellulose with pyrosulfuric acid in the presence of a tertiary amine at a temperature between 20 and 130° C.

6. Process for the preparation of cellulose sulfuric acid comprising reacting cellulose with pyrosulfuric acid in the presence of a tertiary amine at a temperature of between 75 and 90° C.

7. Process for the preparation of cellulose sulfuric acid comprising reacting forty-five parts of cellulose with the reaction mixture of thirty-seven parts by volume of 95% sulfuric acid and fifty-five parts by volume of chlorosulfonic acid in the presence of 438 parts by weight of pyridine at 110° C. for two hours.

GEORGE W. RIGBY.